(12) United States Patent
Zastrow et al.

(10) Patent No.: US 11,391,065 B2
(45) Date of Patent: *Jul. 19, 2022

(54) WIRELESS METHOD AND APPARATUS FOR REMOTE LOCK OPERATING WITH MOBILE COMMUNICATION DEVICE

(71) Applicants: Justin Zastrow, San Diego, CA (US); Ira Hayes, San Diego, CA (US); William Birgen, Tempe, AZ (US)

(72) Inventors: Justin Zastrow, San Diego, CA (US); Ira Hayes, San Diego, CA (US); William Birgen, Tempe, AZ (US)

(73) Assignee: Smart Armor Protected, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/111,799

(22) Filed: Aug. 24, 2018

(65) Prior Publication Data

US 2019/0003205 A1 Jan. 3, 2019

Related U.S. Application Data

(63) Continuation-in-part of application No. 15/330,938, filed on Jun. 6, 2014, now Pat. No. 10,062,231.

(Continued)

(51) Int. Cl.
*E05B 47/00* (2006.01)
*E05B 47/06* (2006.01)
(Continued)

(52) U.S. Cl.
CPC ........ *E05B 47/0003* (2013.01); *A47B 88/463* (2017.01); *A47G 29/124* (2013.01); *A47G 29/141* (2013.01); *A47G 29/20* (2013.01); *B64C 39/024* (2013.01); *B64D 9/00* (2013.01); *E05B 45/005* (2013.01); *E05B 47/02* (2013.01); *E05B 47/06* (2013.01); *E05B 65/46* (2013.01); *E05B 65/52* (2013.01); *E05B 67/003* (2013.01);
(Continued)

(58) Field of Classification Search
CPC . G07C 9/00309; G07C 9/00571; E05B 47/00; E05B 2047/0037; E05B 2047/0073; E05B 2047/0074; E05B 2047/0094; E05B 57/00; E05B 55/00
USPC .................................................. 340/5.6–5.64
See application file for complete search history.

(56) References Cited

U.S. PATENT DOCUMENTS 4,985,792 A * 1/1991 Moir .................. G11B 19/2009
360/98.07
6,611,414 B1 * 8/2003 Lavelle ................. E05C 19/168
361/154

(Continued)

*Primary Examiner* — Benyam Haile
(74) *Attorney, Agent, or Firm* — Venjuris, P.C.

(57) ABSTRACT

Method and its enabling device for remote wireless micro-latching for security purposes, comprising at least one user or controller, one mobile communication device, and one secured device, whereas said user is enabled to open or close a micro-latch in said a secured device, for instant a safe box or a medical cabinet, allowing access to secured content, including money, ID card, checks, as well as medicine. Also disclosed is a multiplicity of said devices and their preprogrammed remote control by computer or mobile app. The micro-latching can be amplified to macro-latching, for instance by a micro-solenoid switching a high power electrical switch bank or relay, which in turn initiates industrial processes.

7 Claims, 5 Drawing Sheets

Related U.S. Application Data (60) Provisional application No. 61/833,214, filed on Jun. 10, 2013, provisional application No. 61/915,727, filed on Dec. 13, 2013.

(51) Int. Cl.

| | | |
|---|---|---|
| *E05B 65/46* | (2017.01) | |
| *E05B 65/52* | (2006.01) | |
| *A47B 88/463* | (2017.01) | |
| *A47G 29/124* | (2006.01) | |
| *A47G 29/14* | (2006.01) | |
| *A47G 29/20* | (2006.01) | |
| *E05G 1/04* | (2006.01) | |
| *B64C 39/02* | (2006.01) | |
| *B64D 9/00* | (2006.01) | |
| *E05B 71/00* | (2006.01) | |
| *G07C 9/00* | (2020.01) | |
| *E05B 47/02* | (2006.01) | |
| *E05B 45/00* | (2006.01) | |
| *E05B 67/00* | (2006.01) | |
| *E05G 1/00* | (2006.01) | |

(52) U.S. Cl.
CPC ............ *E05B 71/00* (2013.01); *E05G 1/04* (2013.01); *G07C 9/00174* (2013.01); *G07C 9/00309* (2013.01); *G07C 9/00944* (2013.01); *A47G 2029/1257* (2017.08); *B64C 2201/128* (2013.01); *E05B 2047/0058* (2013.01); *E05B 2047/0069* (2013.01); *E05B 2047/0094* (2013.01); *E05B 2047/0097* (2013.01); *E05G 1/005* (2013.01); *G07C 2009/00642* (2013.01); *G07C 2009/00769* (2013.01)

(56) References Cited

U.S. PATENT DOCUMENTS

| | | | | |
|---|---|---|---|---|
| 7,068,765 | B2* | 6/2006 | Chen | H04M 11/007 379/102.01 |
| 2002/0024420 | A1* | 2/2002 | Ayala | E05B 5/003 340/5.61 |
| 2003/0039180 | A1* | 2/2003 | Mueller | G11B 15/6835 360/92.1 |
| 2003/0049105 | A1* | 3/2003 | Mueller | G11B 15/6835 414/277 |
| 2003/0098777 | A1* | 5/2003 | Taylor | G07C 9/00103 340/5.61 |
| 2005/0063092 | A1* | 3/2005 | Xu | G11B 33/148 360/99.21 |
| 2009/0168233 | A1* | 7/2009 | Kouno | G11B 33/1466 360/99.21 |
| 2012/0052879 | A1* | 3/2012 | Wildon | H04L 67/42 455/456.1 |
| 2013/0009409 | A1* | 1/2013 | Chang | E05B 63/0056 292/64 |
| 2013/0176107 | A1* | 7/2013 | Dumas | G07C 9/00571 340/5.61 |
| 2014/0254896 | A1* | 9/2014 | Zhou | B25J 9/0006 382/124 |
| 2014/0292481 | A1* | 10/2014 | Dumas | G07C 9/00111 340/5.61 |
| 2015/0107316 | A1* | 4/2015 | Kirkjan | G07C 9/00182 70/275 |
| 2015/0371469 | A1* | 12/2015 | Scalisi | E05B 47/026 340/5.52 |
| 2016/0033966 | A1* | 2/2016 | Farris | A47G 29/122 701/15 |
| 2016/0186465 | A1* | 6/2016 | Nelson | E05B 17/10 220/210 |
| 2016/0327356 | A1* | 11/2016 | Milde, Jr. | F41A 17/44 |
| 2017/0263067 | A1* | 9/2017 | Scalisi | G07C 9/00563 |
| 2018/0313115 | A1* | 11/2018 | Overgaard | E05B 47/0002 |
| 2018/0354649 | A1* | 12/2018 | Ortiz | B64F 1/007 |

\* cited by examiner

WIRELESS METHOD AND APPARATUS FOR REMOTE LOCK OPERATING WITH MOBILE COMMUNICATION DEVICE

CROSS-REFERENCE TO RELATED APPLICATION

The present application is a continuation-in-part of United States patent application entitled "Wireless Method and Apparatus for Remote Lock Operating with Mobile Communication Device," having Ser. No. 15/330,938, filed on Jun. 6, 2014, which claims benefit of U.S. provisional application Ser. No. 61/833,214 filed on Jun. 10, 2013 and U.S. provisional application Ser. No. 61/915,272 filed on Dec. 13, 2013.

FIELD OF THE INVENTION

This invention relates to prevent access to or theft of valuables by autonomous mobile communication means through the Internet requiring proximity or attempt detection. It also relates to remotely opening and closing optical micro-shutters and micro valves without flow rate controls using micro-solenoid. It relates also to remote controlled micro-to-macro lock, latch, shutter and valve amplification triggering via Bluetooth synched phone or tablet command, as well as to sequential remote multi-positioning semi-servo operations.

BACKGROUND OF THE INVENTION

The invention addresses a need for a long awaited initiation and termination controls system commanded wirelessly from tablet or smartphone or such to devices and processes, which need secure latching or stop and go actions either on the micro-scale or on the macro-scale.

For instance, there is a great demand for remote locking or unlocking safe boxes, safes, gun cabinets, guns triggers, storage rooms and cabinets for paints, acids, solvents and fuels and numerous similar devices.

While these may be locked and unlocked with micro-solenoids running on low voltage, by amplifying the micro-latching to macro-latching, for instance by switching with it a high voltage circuit breaker, large scale processes in industry and commerce can also be initiated or terminated this way.

This can be done semi-manually, for instance closing by hand, but opening remote, or fully automatically preprogrammed, say based on sensory data.

There is also a great need for wireless remote operation of generic devices involving energizing and de-energizing, opening and closing, power turning on and interruption, kill-switching and born-switching, as well as step-by-step stages switching to substitute continuous servo operations by quantum step-up and step-down operations.

Values and even lives can be saved with such methods and devices. In the industry, it can simplify and speed up emergency operations. In home, for instance, the air conditioning can be adjusted by one or two degrees increments of temperature up or down by simply touching or tapping the tablet or smartphone screen button repetitively, just like the operator would do it on the wall controller unit, however he/she may be far away, but coming and wishes to cool or warm the home by the time he/she gets there.

Therefore, the main object of the invention is to provide for such methods and devices.

SUMMARY OF THE INVENTION

The above problems and others are at least partially solved and the above objects and others realized in a process, enabled by its device, which according to the teachings of this invention, uses at least one micro-latch of solenoid or other type, which can be activated at low voltage remotely and wirelessly from a tablet or smartphone to open and possibly close a safety enclosure, like a safe box, medical cabinet, gun lock and similar devices. Solved also problems of micro-latching to macro-latching amplification, for instance when said micro-solenoid turns on or off a high voltage switch, which in turn opens or closes large scale devices and processes, such as security gates, industrial valves, garage and pet doors, floodgates and more. The initiation or termination of any such micro or macro actions and processes are either manual, though remote, or preprogrammed and relies on sensory data. The proposed solution includes step-by-step (consecutive) stages switching (ratcheting) to substitute continuous servo operations by quantum step-up and step-down operations, with manual or automatic reset.

BRIEF DESCRIPTION OF THE DRAWINGS

Referring to the drawings.

DETAILED DESCRIPTION OF A PREFERRED EMBODIMENT

Figure 1:
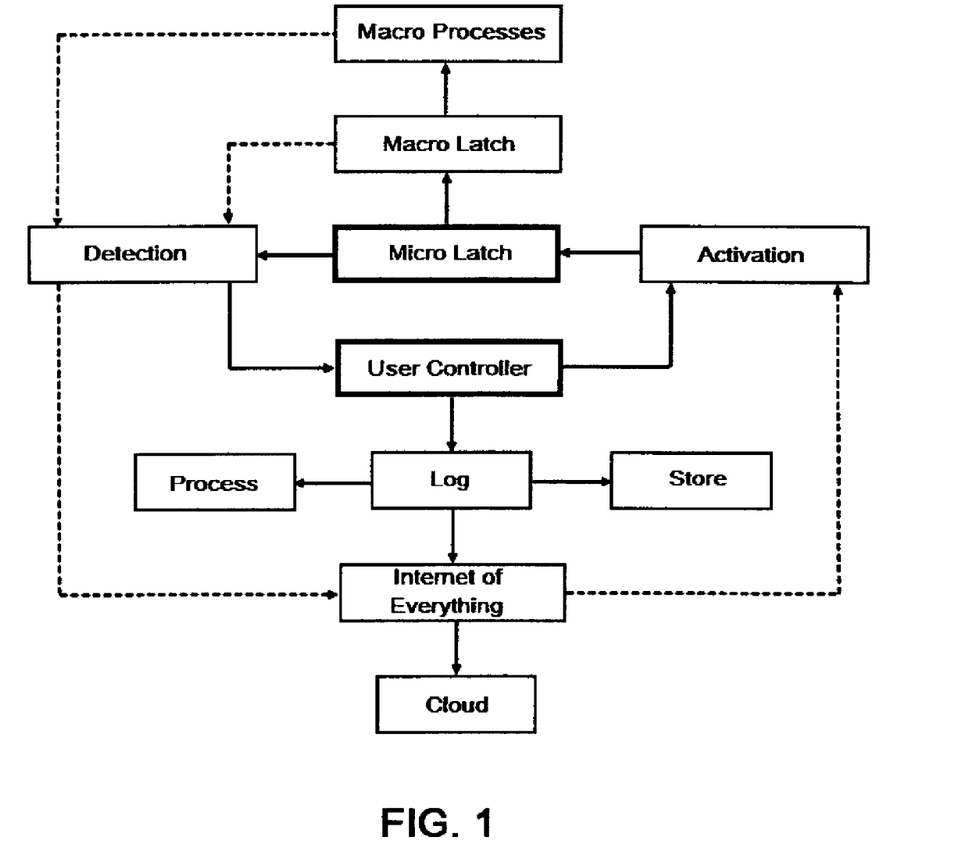
FIG. 1 is a schematic diagram of the method of remote micro-latching in accordance with the teachings of the invention.

Attention is now turned to FIG. 1, which illustrates by a schematic flowchart of the method of remote micro-latching as per the teachings of the invention and its extension to macro-latching.

The method comprises a set of blocks representing hardware, which is all blocks above User Controller (excluding User Controller) and another set, all bellow, representing software (including human action). It illustrates the remote action originated at the User Controller (a person or a protocol owned, controlled and activated by at least one person) and the action of opening or closing the Micro Latch, which physically moves at least one body, using micro-solenoid, or equivalent, and thereby opening or closing at least one micro-latch for security purposes.

The flowchart has one closed loop, an alternate loop and several branching offs, describing a process resulting in said actions through a series of steps. The process works as follows.

In the simplest configuration, only the actions in the loop (represented by full line arrows) are executed. That is, the User Controller (a person) sends command via a tablet or mobile telecom device, such as a mobile phone, marked as Activation, to an electronic security apparatus, comprising communication and computation electronics and at least one micro-mechanical latch, such as a spring retained micro-solenoid, to open or close a micro-latch, and with that a security device, for instance a safe keeping box, used as electronic valet, holding money, driver's license, medication and such. Said box may be attached to that mobile device detachably or permanently. Said electronics then senses the completion of said latching, marked by Detection, and signals back to the User Controller accordingly. Both of these electronics communications are carried through said mobile device. The User Controller, who should be the owner of said security box, can open or close that box remotely at will, to prevent unauthorized access or to get his/her own access as needed. Hardware for such procedures are either readily available in part or can be built entirely from off-shelf components. Preferable embodiments are shown in the cross-referenced patent applications. In this process, the Activation and Detection is incidental or auxiliary, though necessary components. The main blocks, the User Controller and the Micro Latch (shown with heavy contours), however are the key components of will or intent and action or execution of opening or closing a secure device. These are the only two blocks unconnected here.

The skilled in the art may readily perceive that this simple procedure can be expanded to macro-latching and macro-processes by amplification or leverage devices and processes. For instance, the micro-latch may trigger the opening or closing of a macro-latch (marked by Macro Latch), say an electric switch or relay or safety pin of a secure cabinet, holding jewelry, guns, cash, deeds or other valuables. It may also trigger other macro-processes (marked by Macro Processes), such as opening cattle floodgates, dropping drone delivered package or shutter and such. In fact, any and all industrial processes requiring servo valve or lock operations may use this micro-to-macro amplifying process to trigger large scale action remote by a mobile phone.

One may also realize that related data of the described procedure can be useful for future need, thus can be logged (marked by Log), stored (marked by Store) and processed (marked by Process block). The User Controller, for instance, wishes to see when the last time said latch opened and closed, wishes to study the latching occurrence frequency, and wishes to retrieve such data upon demand. For instance, if the User Controller is a person in charge of an aging patient's medication storage box, who need to be reminded to take his/her pills, the User Controller can remind his/her patient, with a simple software extension to the above disclosed process, and check if the patient really took his/her medication, which one and when and where, as located and logged by GPS, and if not, he/or she can take action, to make sure that the patient is taken good care of, at least in this respect.

It shall be obvious that the User Controller may want preprogrammed actions triggered upon predefined conditions met, rather than opening or closing the micro-latch in person. He/she can do that through the Internet using software and apps designed and build for that need. In fact, the Internet of Everything (marked as Internet of Everything), which interconnects devices, can execute such procedure autonomously, provided that it is preprogrammed. It also can use cloud computing (marked as Cloud), storage and backing up and execute the micro-latching through the dotted arrows shown.

In such configuration, the detection and activation may not be singular but rather multiple. For instance, a swarm of autonomous detectors may work in concert to feed data to said computing means, which in turn would define the action(s) to take in this process (single or multiple remote micro-latching), and give command signal(s) accordingly for proper execution, about which further detection(s) may supply confirmation. All that implies that now the security and robustness of the complex wireless communication system involved becomes paramount and as such, it may call for encryption and supercomputing, both available as prior art. For being applied for security, provisions for dead battery conditions and false identifications, with emergency protocols (e.g., first use paring, PIN code verification, iris and fingerprint ID), including encryption, may need to be established and provided for.

Examples of such preprogrammed autonomous remote micro-latching would be locking security doors upon unauthorized entry detection and triggering camera or defense actions as the preprograming commands, e.g., power interruption by kill switch disabling, while warning the facility owner or manager (User Controller) about the events online in real time allowing for manual override. Such detection may use proximity sensing and geo-fencing technology. One may recognize by now that the User Controller is a user if it is a person and a controller if it is a computer.

Applications around home could include, garage door opening upon car approach and other concurrent conditions to meet; pet door unlocking upon own pet's arrival, while locking out alien pets and animals, for instant raccoons; gun storage cabinet, gun trigger, medical cabinet, medication transporter, jewelry and cigar box, paint, fuel, alcohol and medication storage cabinet, personal secure purse and wallet-like or tablet size case, briefcase, luggage, backpack, pill bottle, gym and school locker, pad lock, master-lock and such.

Applications elsewhere could include, industrial process control, valves and latches control, fluid and gas flow controls, fluidic computing, laboratory process control, security gates and doors and many more.

Next a bicycle lock is illustrated as an exemplary embodiment of the invention using micro-solenoid latching.

Figure 2:
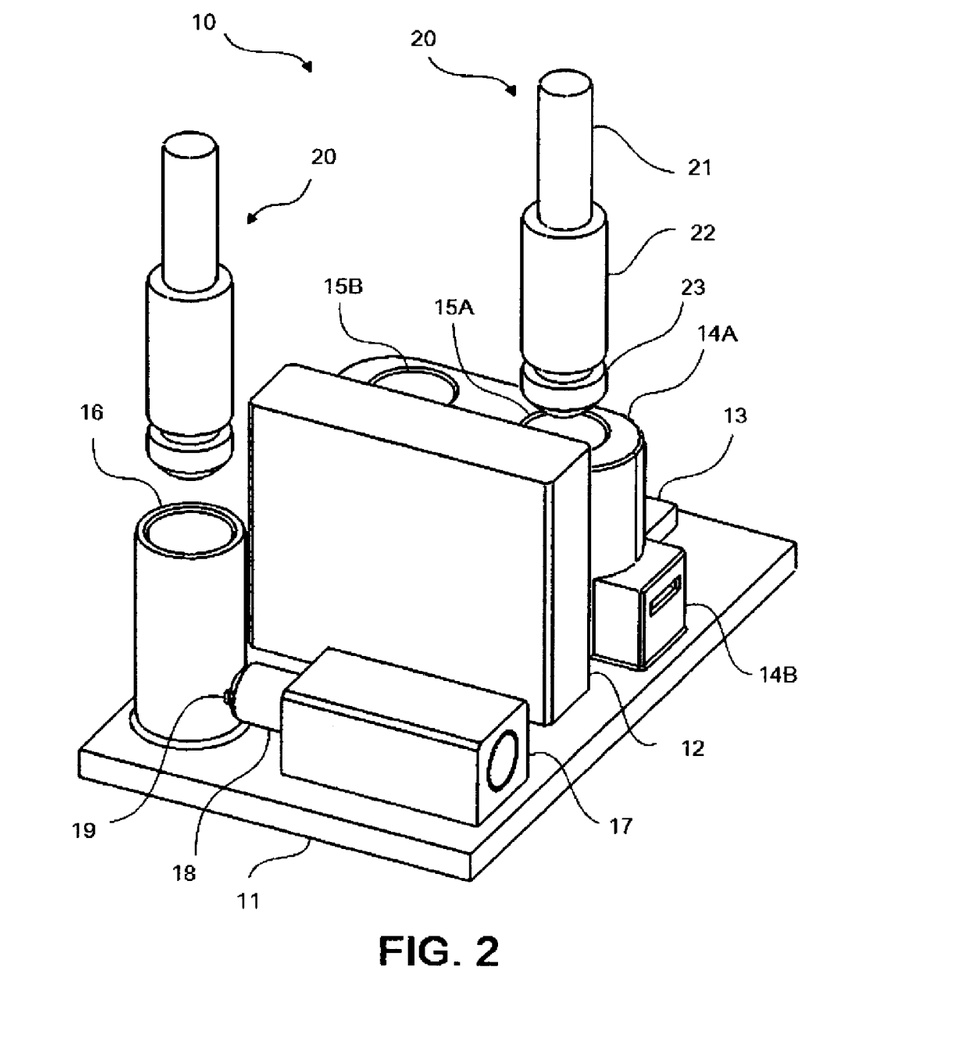
FIG. 2 is a diagrammatic view of a micro-latch mechanism designed to secure bicycles.

Attention is now turned to FIG. 2, which by isometric view illustrates assembly 10, comprising base 11, beacon 12, microcontroller 13, socket 14A with manual lock 14B, receiver 15A in use, receiver 15B not in use, socket sleeve 16, micro-solenoid 17, and spring retained piston 18 with retainer tongue 19.

The bicycle may be locked by cable 20, comprising flex wire cable 21, gripping head 22 with retainer lip and tip 23.

One end of cable 20 locks manually in receiver 15A, while the other end in sleeve 16 by manual push down. This end can be remotely relived (unlatched) by tongue 19, which receives its coil energizing command from controller 13, which is preprogrammed to communicate with the app wirelessly, say through Bluetooth, say from a tablet or smartphone.

One can perceive that solenoid 17 may be substituted by double chip inductors or electromagnets, one pushing and the other one (opposing) pulling. Also perceivable is the configuration in which solenoid 17 pushes the switch bank of a higher power electrical switch or relay, by which action the micro-switching gets amplified, since that electrical switch can turn on any high power lock, valve, gate, shutter and such, amplified thus form micro-latching to macro-latching. For obviousness, such devices are not illustrated here. Several other applications are shown in the referenced patent applications.

Figure 3A:
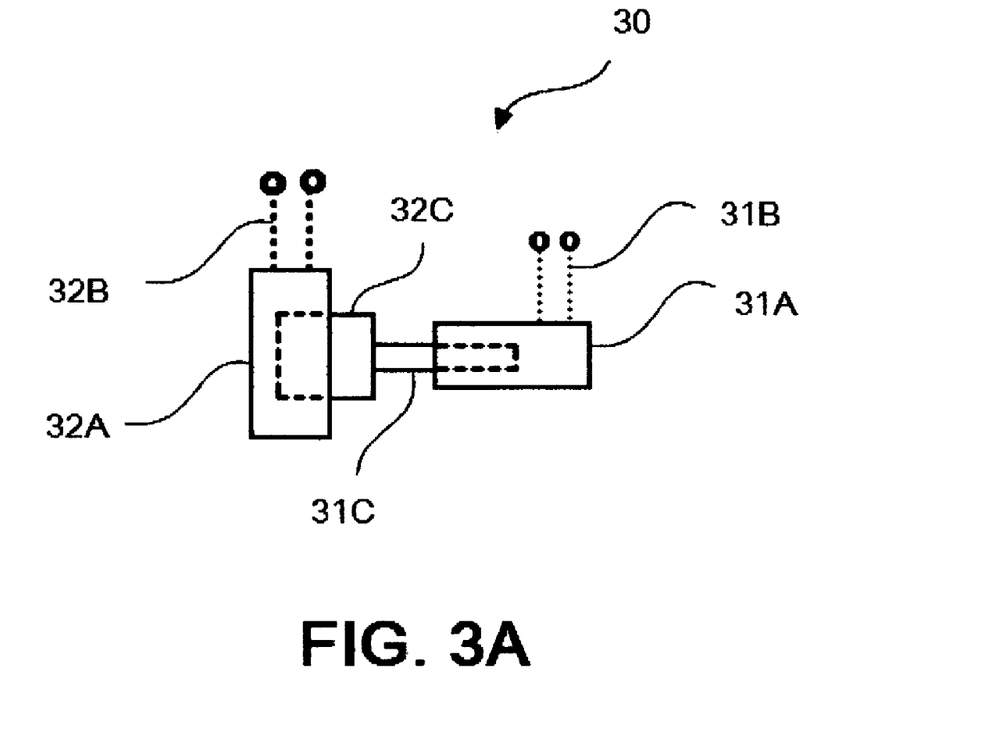
FIG. 3A is diagrammatic view of a single stage micro-to-macro latch mechanism.

Attention is now turned to FIG. 3A which by assembly 30 illustrates in diagrammatic view a single stage micro-to-macro latch mechanism.

Assembly 30 comprises micro-switch body 31A with low voltage wires 31B and solenoid activated spring returned pin 31C, macro-switch body 32A with high voltage wires 32B and spring returned switch bank 32C.

Upon remote command through wires 31B, pin 31C pushes bank 32C, which makes the high voltage contact to power wires 32B. Wires 31B and 32B are power and command wires.

Figure 3B:
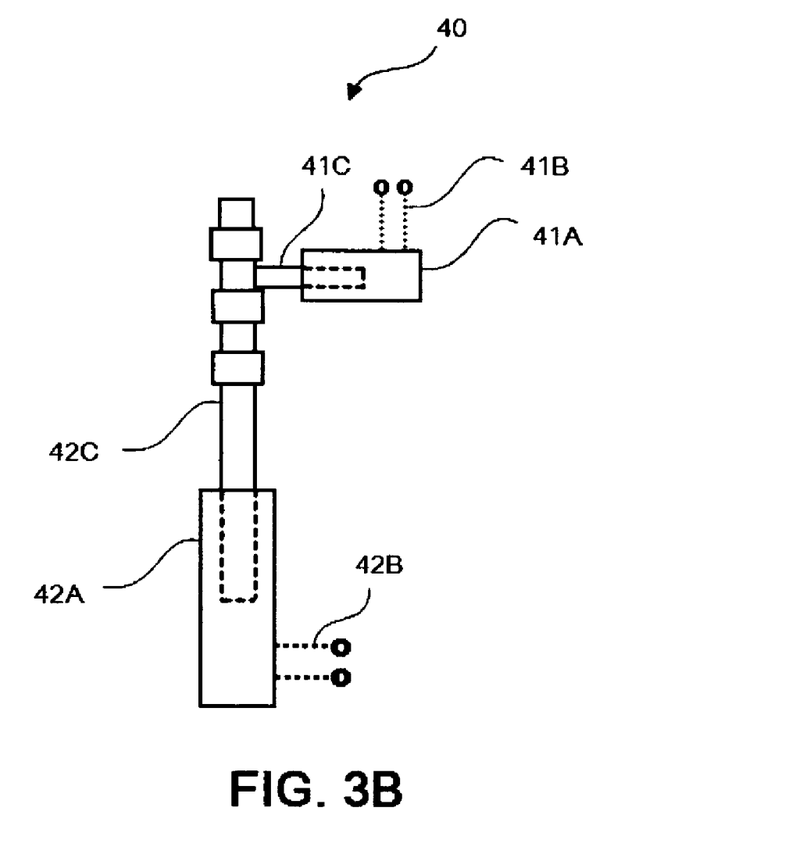
FIG. 3B is diagrammatic view of a multi stage micro-to-macro latch mechanism.

Attention is now turned to FIG. 3B which by assembly 40 illustrates in diagrammatic view a multi stage micro-to-macro latch mechanism.

Assembly 40 comprises micro-switch body 41A with low voltage wires 41B and solenoid activated spring returned pin 41C, macro-switch body 42A with high voltage wires 42B and spring returned ratcheting switch bank 42C.

Upon remote command through wires 41B, pin 41C pulls back from bank 42C, which makes the high voltage contact to power wires 32B in stages. Wires 31B and 32B are power and command wires. Four stages are possible as shown here for mere example. The macro-switch is shown in its second position counting from the top. Bank 42C may be spring loaded and two-way (up and down) solenoid operated.

The micro-to-macro switching may be executed in multiple ways and means, other than illustrated in FIGS. 3A and 3B. The advantage of this method over continuous servo operation of its simplicity and economy, for many such operations are suffice with staged settings. For instance, a temperature setting of an oven or refrigerator need no continuous control, thus for such devices, remote adjustment via mobile communication means are practical introduction to and preparation for the coming internet of everything world.

Figure 4:
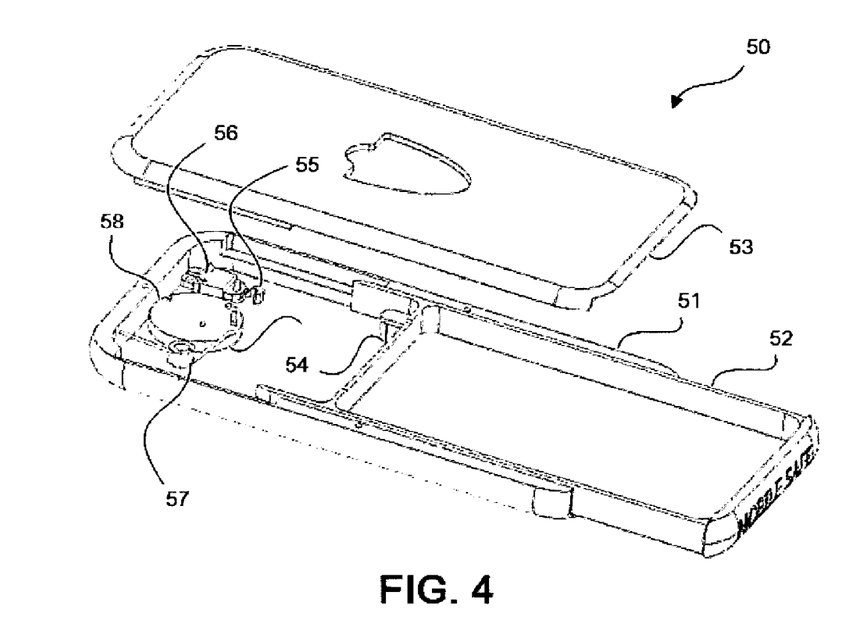
FIG. 4 is an isometric view of a mobile safe dissembled.

Attention is finally turned to FIG. 4 which by assembly 50 illustrates in isometric view an exemplary embodiment of the invention, a personal mobile safe for keeping passport, driver's license, money and such.

Assembly 50 comprises base 51, drawer 52, cover 53, hook 54, latch 55, solenoid 5, spring 57 and battery 58.

It works similarly as the bicycle lock of FIG. 2. One has to close it manually and open it remote. If stolen, it remains closed.

Battery power previously described could be a collection of batteries in series or parallel or both. Additional power sources for microcontroller and powered to unlatch actuator are outlet power, on a municipality power grid, or a stand along off grid power source.

Alternatively, other power sources, no battery sources, or miniature batteries could be used. For example, an alternative power embodiment could include a dynamo power source on the latch device. In this case, the micro-controller, BLE board and motor could be powered by a dynamo, mechanically acted upon by the user to generate power. The power generated by said dynamo to be rectified using typical rectifying circuit suitable to the downstream components. In lieu of a rectifying circuit the dynamo may instead charge a battery which would in turn power downstream electrical components.

Another alternate power embodiment could include a waveguide power source on the latch device. Here, the micro-controller, BLE board and motor could be powered by power generated by a waveguide, wirelessly acted upon by the user to generate power. The power generated by said waveguide to be rectified using typical rectifying circuit suitable to the downstream components power consumption. In lieu of a rectifying circuit the wave guide may instead charge a battery which would in turn power downstream electrical components. In the event the waveguide power output is AC, a transformer will be required. The waveguide structure could be local and integrated into the latch housing (of invention) or the waveguide could be integrated into the structure of a nearby building or flat on surrounding property, ground or roof.

Powering an actuator to unlatch from the locked state could be used in conjunction with a powering a second actuator to unlatch from a latch in the open condition. This would entail a latch which keeps the described latch in the unlocked condition. Exiting this unlocked latch state would require power and a signal in the same manner as the latch mechanism for exiting the locked state. That is, two latched states exist though their conditions are mutually exclusive.

Another alternate embodiment could include a tamper lock. In this case, an emergency single use lock could be activated under certain pre-defined conditions. This emergency lock would be designed by those in the art to be defeated only by physically cutting, drilling or otherwise destroying the invention, in part or wholly. One such pre-defined condition would be extreme vibration caused by severe shaking or rattling. The exact threshold to be met before deployment shall be determined through testing.

Alternatively, the pre-defined activation condition could also occur if an attempt was made to breach said lock with a drill or saw. When some internal mechanical device was breached a spring would drive out pin(s) permanently engaging them in a receiving/mating receptacle. The force driving said pin(s) could be compressed gas pocket, or canister, released when breached.

Alternatively, the force could be created by springs acting against a magnetic drive force. Once the spring is severed the magnetic drive force would plunge the pin(s) into their receiver. Furthermore the pin(s) could be embedded with a biased serration preventing the removal of said pin(s).

Yet another embodiment could utilize glass to hold spring forces at bay, preventing the spring(s) from driving the failsafe lock pin(s) into the lock state, until the glass rod(s) or cylinder(s) are fractured through some violent act made against the structure of the latch mechanism.

Yet another use of said failsafe tamper lock would be for the user to have the ability to deploy this lock, in the event said user suspected someone with access being forced to gain access/entry under duress, say as a hostage or at gunpoint.

The present invention is described above with reference to a preferred embodiment. However, those skilled in the art will recognize that changes and modifications may be made in the described embodiment without departing from the nature and scope of the present invention. For instance, said Bluetooth may be substituted by IMS, ZigBee, Z-wave, WiFi, TinyMesh or other more modern means of wireless communication. Said mobile computing device may also be smartphone, tablet, computer, microchip and other suitable device. Said micro-solenoid may be chip inductor, servo, bi-metallic, shape memory alloy, piezoelectric stack actuator bank, stepper, skipper and jumper motors, swings and slides or such. All these are considered obvious substitutes being within the scope of the invention.

Various further changes and modifications to the embodiment herein chosen for purposes of illustration will readily occur to those skilled in the art. To the extent that such modifications and variations do not depart from the spirit of the invention, they are intended to be included within the scope thereof.

The invention claimed is:
1. A remote lock system, comprising:
(a) a battery;
(b) a micro-to-macro latch mechanism, the micro-to-macro latch mechanism comprising a micro-switch body comprised of a low voltage conductor funtionally coupled to activate a solenoid activated spring return pin, a macro-switch body comprising a high voltage conductor, the solenoid activated spring return pin configured to switch between a first position and a second position depending on the voltage applied to the low voltage conductor, (c) the macro-switch body comprising an electromagnetic lock activated by contact of a bank coupled to the solenoid activated spring return pin in the second position, the electromagnetic lock configured to lock via the high voltage conductor when the solenoid is in the first position and unlock when the solenoid is in the second position, and (d) a microcontroller configured to receive a command from a remote controlling device and configured to switch the solenoid between the first and second positions via the low voltage conductor.

2. The remote lock system of claim 1, wherein:
(a) the electromagnetic lock further comprises:
   i. a spring-loaded latch body,
   ii. a latch catch configured to receive and secure the latch body, and
   iii. an electromagnetic actuator configured to actuate the latch body; and
(b) the electromagnetic lock is unlocked when the electromagnetic actuator is powered by the battery to extract the latch body from the latch catch.

3. The remote lock system of claim 2, wherein the electromagnetic lock further comprises:
(a) a rod with the latch catch; and
(b) a rod receiver coupled to the latch body and configured to receive the rod until the latch catch secures the latch body.

4. The remote lock system of claim 1, wherein:
(a) the electromagnetic lock further comprises:
   i. a latch body,
   ii. a spring-loaded latch catch configured to receive and secure the latch body, and
   iii. an electromagnetic actuator configured to actuate the latch catcher; and
(b) the electromagnetic lock is unlocked when the electromagnetic actuator is powered by the battery to open the latch catcher to release the latch body.

5. The remote lock system of claim 1, wherein the microcontroller is further configured to detect and report, to the remote controlling device, a locking status of whether the electromagnetic lock is locked when the locking status changes.

6. The remote lock system of claim 1, wherein the microcontroller is further configured to warn the remote controlling device when the battery is low.

7. The remote lock system of claim 1 further comprising a tamper lock.

* * * * *